Patented Mar. 21, 1939

2,150,921

UNITED STATES PATENT OFFICE 2,150,921

MANUFACTURE OF IMINO-AMINO-METH-ANE-SULPHINIC ACID

Emeric Havas, Pitman, N. J., assignor to E. I. du Pont de Nemours & Company, Wilmington, Del., a corporation of Delaware No Drawing. Application November 10, 1937, Serial No. 173,847

6 Claims. (Cl. 260—513)

This invention relates to the manufacture of imino-amino-methane-sulphinic acid, and has as its object to provide an economical process for manufacturing this compound on a commercial scale. It is a further object of this invention to provide a process for producing the above compound in good yield and high quality, and by simple steps of procedure which lend themselves readily to large scale operation.

Imino-amino-methane-sulphinic acid is a compound prepared from thiourea and hydrogen peroxide. The latter acts as an oxidizing agent, and the resulting compound is believed to have a structure corresponding to the following formula

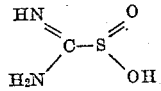

It is useful as a reducing agent for vat dyes. This compound, also known as "thiourea-dioxide" and as "formamidine-sulphinic acid", was first described by Barnett (Jour. Chem. Soc., vol. 97, p. 63), who prepared it by adding powdered thiourea to a 6% aqueous solution of hydrogen peroxide. Later it was prepared again by Vanino and Schinner (Ber. 47, 703), who entered thiourea into a 30% solution of hydrogen peroxide.

I have checked into both of the above processes and found them deficient for practical commercial operation. The process of Barnett gives a fairly good quality product, but its yield is low amounting only to about 43% of theory as based on the thiourea employed. Furthermore this process is bulky and requires the handling of 25 volume parts for each part of the product produced. The process of Vanino et al., on the other hand, is too violent and leads to an impure product. Indeed, the product obtained by these authors was so impure that they themselves did not recognize it, and it was not identified as imino-amino-methane sulphinic acid, in impure state, until many years later, by the editors of the 4th edition of Beilstein. (Beilstein, 4th ed., supplement to vol. III, pages 36 and 662.)

Now according to my improved process, the above compound may be produced in high yield and in an extremely high state of purity, by arranging the reaction of thiourea and hydrogen peroxide according to the special process set forth below. In the first place, I employ both the thiourea and hydrogen peroxide in the form of solutions. The prior art used solid thiourea. In the second place I propose to feed the hydrogen peroxide solution slowly into the thiourea solution, instead of vice versa. By proceeding in this manner, I find myself at liberty to use concentrated hydrogen peroxide solution without danger of local overheating and without risk of decomposing the reaction product or of producing undesirable by-products.

As in the processes of the art, precautions are taken in my process to avoid rise in temperature of the reaction mass above room temperature. This is most effectively accomplished by cooling the reaction mass, with ice or otherwise, preferably maintaining it at a temperature between 0 and 10° C.

Because thiourea is but moderately soluble in water at room temperature (about 10% by weight), I prefer to arrange my process further into a series of alternate steps, whereby the reaction mass is saturated anew with thiourea as soon as a previously added quantity thereof has been exhausted by the reaction. More particularly, I start with a saturated or nearly saturated aqueous solution of thiourea and feed into it hydrogen peroxide at a slow rate to keep the temperature under control. When the initial quantity of thiourea has been substantially exhausted, I add a further quantity of thiourea and then feed in additional hydrogen peroxide until the new quantity has been substantially exhausted. This procedure is repeated again and again until the capacity of the reaction vessel has been reached. In this fashion I am enabled to produce a maximum quantity of imino-amino-methane-sulphinic acid in a given operation, without unduly increasing the bulk of the reaction mass and without permitting any solid thiourea to come in contact with a concentrated solution of hydrogen peroxide.

Without limiting my invention to any particular procedure, the following example will illustrate my preferred mode of operation. Parts mentioned are by weight.

Dissolve 100 parts of thiourea in 1000 parts of water, cool to 7° C. and add, as fast as temperature control will permit, 320 parts of 28% hydrogen peroxide (or the equivalent amount of another concentrations). Keep temperature at 7 to 10° C. with external cooling. When all is added, add 100 parts more thiourea and 320 parts of 28% hydrogen peroxide under the same conditions, and repeat the alternate addition of thiourea and hydrogen peroxide until 700 parts of thiourea and 2240 parts of hydrogen peroxide have been added. The reaction product crystallizes out, is filtered and dried. It is substantially chemically pure.

It will be understood that the above example is merely illustrative, and that the procedure may be varied within wide limits as to concentrations, quantities employed, and other details, within the skill of those engaged in the art. For instance, although I have indicated above my preference for starting with substantially saturated thiourea solutions, one may if desired overstep said limit and employ a saturated solution of thiourea containing some of the solid phase suspended therein. Provided the solid phase is well distributed through the reaction mass, there is no danger of seriously affecting the quality of the reaction product. On the other hand, more dilute solutions of either the thiourea or the peroxide may be employed, except that it is more economical to work with concentrated solutions.

The rate of feeding of the hydrogen peroxide is governed by the temperature developed during the reaction. It is desirable to keep down this temperature below room temperature, and preferably not above 10° C.

It will be clear from the above that I have produced a novel and efficient method for producing imino-amino-methane-sulphinic acid which is particularly adapted for production on large scale and which has the further advantages over the art in that it gives a very much greater yield and a product of exceptional purity.

I claim:

1. In the process of preparing imino-amino-methane-sulphinic acid, the step of reacting together an aqueous solution of thiourea and an aqueous solution of hydrogen peroxide.

2. The process of producing imino-amino-methane-sulphinic acid, which comprises feeding an aqueous solution of hydrogen peroxide into an aqueous solution of thiourea.

3. The process of producing imino-amino-methane-sulphinic acid, which comprises feeding a concentrated aqueous solution of hydrogen peroxide into an aqueous solution of thiourea, while maintaining the reaction mass at below room temperature.

4. The process of producing imino-amino-methane-sulphinic acid, which comprises feeding a concentrated aqueous solution of hydrogen peroxide into an aqueous solution of thiourea, while maintaining the reaction mass at a temperature between 0 and 10° C.

5. The process of producing imino-amino-methane-sulphinic acid, which comprises feeding an aqueous solution of hydrogen peroxide into a substantially saturated aqueous solution of thiourea until the thiourea has been substantially consumed, then adding to the reaction mass a further quantity of thiourea followed by feeding in additional hydrogen peroxide whereby to produce a further quantity of imino-amino-methane-sulphinic acid in the same reaction medium.

6. The process of producing imino-amino-methane-sulphinic acid, which comprises feeding alternately into a reaction vessel an aqueous solution of thiourea and an aqueous solution of hydrogen peroxide, and recovering the crystallized reaction product.

EMERIC HAVAS.